United States Patent [19]

Metzger

[11] 4,416,937

[45] Nov. 22, 1983

[54] POLYMER BLENDS AND LAMINATES AND ADHESIVE FILMS PREPARED THEREFROM

[75] Inventor: Bruce A. Metzger, Newark, Ohio

[73] Assignee: The Dow Chemical Co., Midland, Mich.

[21] Appl. No.: 473,385

[22] Filed: Mar. 8, 1983

Related U.S. Application Data

[62] Division of Ser. No. 215,600, Dec. 12, 1980, Pat. No. 4,376,845.

[51] Int. Cl.³ .............................................. B32B 27/00
[52] U.S. Cl. ................................... 428/286; 428/284; 428/317.7
[58] Field of Search ...................... 428/317.7, 284, 286

[56] References Cited

U.S. PATENT DOCUMENTS

| | | | |
|---|---|---|---|
| 3,445,546 | 5/1969 | Pledger | 525/221 |
| 3,485,783 | 12/1969 | Hehe | 260/27 |
| 3,654,207 | 4/1972 | Arabian et al. | 260/28.5 AV |
| 4,136,069 | 1/1979 | Vachon et al. | 525/221 |
| 4,185,050 | 1/1980 | Lozear et al. | 525/221 |
| 4,337,298 | 6/1982 | Karim et al. | 428/461 |

*Primary Examiner*—James J. Bell
*Attorney, Agent, or Firm*—J. B. Guffey

[57] ABSTRACT

Polymer blends are provided which are characterized by good processability on conventional extrusion equipment to provide films having excellent adhesion to various substrates while still exhibiting good non-blocking properties during film manufacture, storage, shipment and use. Such blends comprise, based upon the total blend weight, from 5 to about 90 weight percent of a high melt index adhesive resin; from about 5 to about 90 weight percent of a relatively low melt index adhesive resin; and from about 5 to about 70 weight percent of non-adhesive resin having a melt index of from about 3 to about 10.

14 Claims, No Drawings

4,416,937

POLYMER BLENDS AND LAMINATES AND ADHESIVE FILMS PREPARED THEREFROM

CROSS REFERENCE TO RELATED APPLICATION

This is a divisional of pending application Ser. No. 215,600, filed Dec. 12, 1980 now U.S. Pat. No. 4,376,845.

BACKGROUND OF THE INVENTION

This invention relates in one aspect to blends of normally solid, adhesive thermoplastic resins with normally solid non-adhesive thermoplastic resins and to films and laminates made therefrom. In another aspect, the present invention relates to blends of low density polyethylene with copolymers of ethylene and relatively polar comonomers such as ethylenically unsaturated carboxylic acids or vinyl ester monomers and to films and laminates thereof. In yet another aspect, this invention relates to 3 or more component blends comprising (1) a relatively high melt index adhesive thermoplastic resin, (2) a relatively low melt index adhesive thermoplastic resin, and (3) a relatively low melt index non-adhesive thermoplastic resin.

A variety of somewhat polar synthetic thermoplastic polymers such as random copolymers of ethylene with acrylic or methacrylic acid; ethylene/vinyl acetate copolymers; etc. are known to exhibit reasonably good adhesion to a variety of metallic and non-metallic substrates and to be useful, for example, in single layer (e.g., free film) form, or as one or more layers in multiple layer film structures, as adhesives, binders, coatings, backings and the like for metallic and non-metallic objects.

In the use of the aforementioned synthetic thermoplastic polymers, particularly in their use in the form of monolayer or multiple layer films thereof, a number of oftentimes competing or conflicting considerations or factors can become involved. For example, it is often desirable that the above-noted type of polymer films exhibit strong adhesion to the type of substrate to which it is to be applied and that such degree of adhesion be achievable at the least strenuous processing or lamination conditions as are practicable in a given instance (e.g., at the lowest practicable combination of lamination temperature and pressure). On the other hand, however, it is also generally desirable that such films do not adhere too firmly to themselves (a phenomenon generally referred to in the art as "blocking") when in roll form during the conditions encountered during the manufacture, storage, shipment or use thereof. This is particularly important since such films could otherwise become extremely difficult, or essentially impossible, to retrieve in undamaged free film from the rolls thereof in which they are conventionally placed for efficient storage, shipment and ultimate use. Accordingly, the development of polymer compositions for laminatable adhesive films having a suitable combination of properties (e.g., suitable physical properties such as tensile strength and elongation, processability on conventional extrusion and lamination equipment, along with the desired high degree of adhesion to various substrates while at the same time not adhering so strongly to itself while in roll form as to cause troublesome "blocking" problems) generally requires a very careful balance between such completing properties and considerations.

In view of the foregoing, it would be highly desirable to provide thermoplastic adhesive polymer compositions having good processing characteristics on conventional extrusion equipment to thereby provide films capable of developing a high degree of adhesion to various substrates while still exhibiting good non-blocking properties to itself when in roll form during the manufacture, storage, shipment and use thereof.

SUMMARY OF THE INVENTION

Such desired thermoplastic adhesive polymer compositions, as well as single layer films thereof and multiple layer films and various laminated articles comprising one or more layers of such compositions, are provided by the present invention in which said composition is a normally solid thermoplastic polymer blend comprising, based upon the total weight of said composition, (a) from about 5 to about 90 weight percent of a first adhesive resin having a melt index of from about 50 to about 700;

(b) from about 5 to about 90 weight percent of a normally solid second adhesive resin having a melt index of from about 3 to about 15; and (c) from about 5 to about 70 weight percent of a normally solid non-adhesive resin having a melt index of from about 3 to about 10.

As used herein, the term "normally solid" means that the polymer component, or polymer blend composition, to which it refers melts at a temperature above (i.e., exists in solid form at) a normal room temperature of about 25° C.

Further, the melt index figures as employed herein are determined pursuant to the procedures of ASTM D-1238 (190° C. using a 2.1 kg weight).

DETAILED DESCRIPTION OF THE INVENTION

Suitable thermoplastic polymers for use as the first adhesive resin component of the polymer blend compositions of the present invention are somewhat polar, relatively high melt index (e.g., having a melt index of from about 50 to about 700 and preferably from about 200 to about 400) polymers including relatively low molecular weight epoxy, polyamide or polyester resins as well as the relatively high melt index random copolymers of a major portion of ethylene with a minor proportion of one or more relatively polar monomers such as ethylenically unsaturated carboxylic acid monomers (e.g., acid, methacrylic acid, crotonic acid, etc.) or the neutralized metallic salts thereof (e.g., as found in the partially neutralized ethylene/carboxylic acid copolymers which are commonly referred to in the art as ionomers); vinyl esters of alkanoic acids (e.g., vinyl acetate, vinyl propionate, vinyl butyrate, etc.); lower alkyl or hydroxyalkyl (e.g., $C_1$ to about $C_8$) esters of the aforementioned ethylenically unsaturated carboxylic acids (e.g., methyl acrylate, ethyl acrylate, hydroxyethyl acrylate, n-butyl acrylate, methyl methacrylate, ethyl methacrylate, etc.); and the like. Thermoplastic polymers which are particularly preferred for use as the aforementioned first adhesive resin component are copolymers having a melt index in the above-noted range and being random copolymers derived from the addition polymerization of from about 50 to about 85 weight percent ethylene with from about 15 to about 25 weight percent of an ethylenically unsaturated carboxylic acid monomer (especially acrylic or methacrylic acid) or a vinyl ester of an alkanoic acid (especially vinyl acetate or vinyl propionate) and optionally with from 0 to about 25 weight percent of one or more of the aforementioned lower alkyl or hydroxyalkyl ethylenically unsaturated carboxylic acid esters.

As has been noted, the aforementioned high melt index adhesive resin component of the present thermoplastic polymer blends can suitably constitute from about 5 to about 90 percent of the total weight of said blends. Preferably, however, such high melt index adhesive resin is employed in the blends of the present invention in the range of from about 15 to about 75 weight percent based on the total weight of such blends and most preferably such high melt index adhesive resin constitutes from about 20 to about 60 weight percent thereof.

Thermoplastic polymers suitable for use as the second adhesive resin component of the polymer blends of the present invention are somewhat polar, normally solid resins having a relatively low melt index such as, for example, those having a melt index in the range of from about 3 to about 15 and preferably in the range of from about 3 to about 10. Examples of such suitable resins include the relatively low melt index versions of the aforementioned random copolymers of a major amount of ethylene with a minor proportion of one or more ethylenically unsaturated carboxylic acid monomers and the neutralized and/or ionically crosslinked versions of such low melt index ethylene/ethylenically unsaturated carboxylic acid copolymers which are commonly referred to in the art as "ionomers". Such suitable low melt index adhesive resins also include the relatively low melt index versions of copolymers of a major proportion of ethylene with a minor proportion of other polar monomers such as, for example, vinyl esters of alkanoic acids, lower alkyl or hydroxyalkyl (e.g., $C_1$ to about $C_8$) esters of the above-noted ethylenically unsaturated carboxylic acids; etc., as well as the various relatively low melt index graft modified olefin polymers (such as, for example, high density polyethylene/acrylic acid graft copolymers; ethylene/vinyl acetate copolymers graft modified with ethylenically unsaturated carboxylic acid monomers such as acrylic acid, maleic anhydride, etc.); relatively low melt index polyester and polyamide resins, and the like.

Preferred low melt index adhesive resins for use as the second adhesive resin component in the present invention include those having melt indexes in the above-cited relatively low range and being random copolymers derived from the addition polymerization of from about 50 to about 98 weight percent ethylene with from about 2 to about 12 weight percent of an ethylenically unsaturated carboxylic acid monomer (especially acrylic or methyacrylic acid) or a vinyl ester of an alkanoic acid (especially vinyl acetate or vinyl propionate) and optionally with from 0 to about 40 weight percent of one or more of the aforementioned lower alkyl or hydroxyalkyl ehtylenically unsaturated carboxylic acid esters.

The above-noted relatively low melt index adhesive resins are typically employed in the polymer blends of the present invention in an amount of from about 5 to about 90 weight percent of the total polymer blend weight and preferably such low melt index adhesive resins constitute from about 10 to about 70 weight percent thereof.

As has been noted, the third essential polymer component of the polymer blends of the present invention is a normally solid, non-adhesive resin having a melt index of from about 3 to about 10. Preferably, this non-adhesive resin component has a relatively low density (e.g., from about 0.91 to about 0.93) and most preferably such resin is a non-polar, olefin polymer resin such as, for example, homopolymers of lower α-olefins (e.g., homopolymers of ethylene, propylene, etc.), copolymers of a major portion of a lower α-olefin (especially ethylene) with a minor portion of higher (e.g., $C_4$–$C_{12}$) α-olefins (e.g., 1-butene, 1-hexene, 1-heptene, 1-octene, etc.), and the like. In addition, it is also preferred that such non-adhesive resin have a melting point of from about 85° to about 120° C. with some particularly preferred non-adhesive resin components having melting points of from about 100° to 120° C. (especially from 110° to 115° C.).

The amount of the above-noted non-adhesive resin employed in the subject polymer blends is generally in the range of from about 5 to about 70 weight percent based upon the total weight of such polymer blends. Preferably, however, such non-adhesive resin component is used in an amount of from about 10 to about 60 weight percent of such polymer blend. Surprisingly, the presence of substantial quantities of such non-adhesive resin component of the present polymer blends does not adversely affect the adhesion of such blend to porous substrates as would normally be expected. Indeed, it has even been observed that the use of up to and including as much as 50 weight percent of such non-adhesive resin in the present polymer blends can actually induce a 2 to 3 fold increase in adhesion to porous substrates relative to that achieved using the indicated low melt index adhesive resin alone or using a two component blend of the aforementioned high melt index and low melt index adhesive resins.

In addition to the above-discussed requisite polymer components, the polymer blend compositions of the present invention can further contain other addition polymeric components as well as the usual additional ingredients and additives conventionally employed in the art for various purposes in polymer compositions, films and the like, such as, for example, dyes, pigments, fillers, anti-oxidants, fire-retarding agents, etc.; and, when such optional ingredients are employed, their usage is generally in the content range or loading level typically utilized in the art for such purposes.

The method by which the polymer blend compositions of the present invention are prepared is not particularly critical to the invention and any convenient, conventional method and equipment (e.g., conventional extrusion equipment, Brabender mixers, etc.) can, therefore, be employed to admix the required components in the desired proportions. However, some of the most beneficial end uses for the present polymer blends involve their use as laminatable adhesive monolayer films; as one or more layers in coextruded multiple layer free-film structures; and as laminated or extrusion coated layers or coatings in various laminates involving a variety of possible metallic or non-metallic substrates (especially somewhat porous non-metallic substrates). Accordingly, the use of conventional extrusion or coextrusion equipment and processes is in general particularly convenient, and preferred, for obtaining intimate admixture of the individual components of the present polymer blends. Naturally, when the aforementioned end uses are involved, the polymer blends can be formulated in a separate extrusion compounding operation prior to the extrusion operation in which the objective film or laminated structures are to be actually made. Alternatively, the individual components of the subject polymer blends can simply be pre-blended (e.g., in pelletized, granular or powdered form) prior to being fed into the extruder used in the film-forming or extrusion coating operation (or can be individually fed as separate, appropriately metered feed streams to said extruder), with the desired degree of intimate admixture of said components then being accomplished in said film-forming or extrusion coating extruder rather than in a separate compounding operation.

As has been noted, the polymer blend compositions of the present invention are particularly well-suited for the preparation of free-standing monolayer or multilayered films (e.g., typically having a thickness in the range of from about 0.5 to about 15 mils and oftentimes in the range of from about 1 to about 5 mils) for various end uses including usage for lamination to various metallic and non-metallic substrates such as for use as outer coating layers or as intermediate adhesive layers in various laminar objects (e.g., as protective outer coatings for metallic substrates; as outer, heat sealable layers in various cellulosic or synthetic polymer-based packaging materials; as an adhesive layer between the same or different type of non-adhesive substrates, such as, for example, between non-woven nylon fabric and polyurethane foam and the like) as well as usage in extrusion coating operations for the preparation of similar laminar objects.

In the above-noted usages of the present polymer blends, conventional auxiliary treatments which are typically used such as radiation crosslinking, corona discharge surface treatments, etc., of films prepared therewith can optionally be employed to modify particular properties (e.g., elevated temperature flow characteristics, degree of adhesiveness to particular substrates, etc.) which may be of special interest in a given instance. However, in this regard, it is worthy of note that a particularly surprising feature of the present polymer blends is that they have been observed to exhibit high degrees of adhesion to at least certain types of porous substrates without corona discharge surface treatments than they do with the benefit of such surface treatments.

The practice of the present invention is further illustrated by, but is not intended to be limited to, the following working examples in which all parts and percentages are on a weight basis unless otherwise indicated.

EXAMPLE 1

In this example, a 1.0 mil adhesive film is extruded from a ternary polymer blend composition composed, on a total blend weight basis, of 50 weight percent of low density polyethylene (melt index=5.0 and density=0.920 g/cc), 30 weight percent of a 300 melt index ethylene/acrylic acid copolymer (20 weight percent acrylic acid based upon the weight of such copolymer), and 20 weight percent of a 5 melt index ethylene/acrylic acid copolymer (6.5 weight percent acrylic acid based upon the weight of said copolymer). The resulting film is employed as a heat sealable glue layer between non-woven nylon fabric and polyurethane foam by heat sealing a series of sample laminates for one second at 40 psi at various set point temperatures on the sealer (i.e., 270° F., 280° F., 290° F. and 300° F.). Thereafter, the degree of adhesion between the non-woven nylon and polyurethane foam substrates is determined for each of the laminates prepared at the different laminating temperatures. In addition, tensile strength, elongation and tear strength of the ternary blend film in free-film form is also determined. The results of these evaluations are summarized in Table I below.

TABLE I

| Polymer Blend Composition |
| --- |
| 50 weight percent low density polyethylene (Melt Index = 5 and density = 0.920 g/cc) |
| 30 weight percent high melt index ethylene/acrylic acid copolymer (Melt Index = 300; acrylic acid content = 20 weight percent) |
| 20 weight percent low melt index ethylene/acrylic acid copolymer (Melt Index = 5; acrylic acid content = 6.5 weight percent) |

Free Film Physical Properties (1 mil Thick Monolayer Film)

Tensile Strength (psi)
MD[1]: 3351
TD[2]: 1795

Elongation (%)
MD[1]: 266
TD[2]: 441

Tear Strength (grams/mil)
MD[1]: 36

Adhesion Provided Between Non-Woven Nylon Fabric and Polyurethane Foam @ Various Heat Seal Temperatures (lb/in)

| 270° F. | 280° F. | 290° F. | 300° F. |
| --- | --- | --- | --- |
| 0.65 | 0.85 | 0.95 | 1.0 |

[1]MD = Value of property taken in Machine Direction
[2]TD = Value of property taken perpendicular to Machine Direction (i.e., Transverse Direction)

EXAMPLE 2

Example 1 is repeated except that a different high melt index ethylene acrylic acid copolymer (i.e., derived from 82.5 weight percent ethylene and 17.5 weight percent acrylic acid and having a melt index of 300) is employed in place of the Example 1 high melt index copolymer.

The results of the corresponding free film physical property evaluations as well as the adhesion provided between non-woven nylon fabric and polyurethane in laminate form are summarized in Table II below.

TABLE II

| Polymer Blend Composition |
| --- |
| 50 weight percent low density polyethylene (Melt Index = 5.0 and density = 0.92 g/cc) |
| 30 weight percent of a high melt index ethylene/acrylic acid copolymer having 17.5 weight percent acrylic acid therein and a melt index of 300 |
| 20 weight percent low melt index ethylene/acrylic acid copolymer having a melt index of 5.0 and an acrylic acid content of 6.5 weight percent |

Free Film Physical Properties (1 mil Thick Monolayer Film)

Tensile Strength (psi)
MD[1]: 2933
TD[2]: 1460

Elongation (%)
MD[1]: 293
TD[2]: 325

Tear Strength (grams/mil)
MD[1]: 38

Adhesion Provided Between Non-Woven Nylon Fabric and Polyurethane Foam @ Various Heat Seal Temperatures (lb/in)

| 270° F. | 280° F. | 290° F. | 300° F. |
| --- | --- | --- | --- |
| 0.98 | 1.6 | 1.8 | 1.9 |

[1]MD = Value of property taken in Machine Direction
[2]TD = Value of property taken across (or perpendicular to) machine direction While the present invention has been illustrated by reference to certain specific embodiments and examples thereof, such fact is not to be understood as in any way limiting the scope of the instantly claimed invention.

What is claimed is:

1. A consolidated laminar structure comprising at least two dissimilar laminar layers, at least one of said layers being composed essentially of a polymer blend composition comprising, based upon the total weight of said composition,
    (a) from about 5 to 90 weight percent of a first adhesive resin having a melt index of from about 50 to about 70 and comprising a random copolymer of a major proportion by weight of ethylene and from about 15 to about 25 weight percent, based upon said copolymer, of an ethylenically unsaturated carboxylic acid;
    (b) from about 5 to about 90 weight percent of a normally solid second adhesive resin having a melt index of from about 3 to about 15 and comprising a random copolymer of a major proportion by weight of ethylene with a minor proportion by weight of an ethylenically unsaturated carboxylic acid, a vinyl ester of an alkanoic acid or a lower alkyl or hydroxyalkyl ester of an ethylenically unsaturated carboxylic acid monomer; and
    (c) from about 5 to about 70 weight percent of a normally solid non-adhesive resin having a melt index of from about 3 to about 10 and comprising a homopolymer of ethylene or a copolymer of a major proportion by weight of ethylene and a minor proportion by weight of a $C_4$–$C_{12}$ $\alpha$-olefin.

2. A consolidated laminar structure comprising at least two dissimilar layers in which at least one of said layers is composed essentially of a polymer blend composition comprising, based upon the total weight of said composition,
    (a) from about 5 to 90 weight percent of a first adhesive resin having a melt index of from about 50 to about 700 and comprising a random copolymer of a major proportion by weight of ethylene and a minor proportion by weight of an ethylenically unsaturated carboxylic acid;
    (b) from about 5 to about 90 weight percent of a normally solid second adhesive resin having a melt index of from about 3 to about 15 and comprising a random copolymer of a major proportion by weight of ethylene with a minor proportion by weight of an ethylenically unsaturated carboxylic acid; and
    (c) from about 5 to about 70 weight percent of a normally solid non-adhesive resin having a melt index of from about 3 to about 10 and comprising a homopolymer of ethylene or a copolymer of a major proportion by weight of ethylene and a minor proportion by weight of a $C_4$–$C_{12}$ $\alpha$-olefin.

3. The consolidated laminar structure of claim 1 or 2 wherein one of the laminar layers is a synthetic polymer foam and one of the laminar layers is a non-woven fabric material.

4. The consolidated laminar structure of claim 1 or 2 in the form of a multiple layered thermoplastic polymer film.

5. The consolidated laminar structure of claim 1 or 2 wherein at least a portion of the carboxylic acid groups of the first adhesive resin are in neutralized metallic salt form.

6. The consolidated laminar structure of claim 1 or 2 wherein the second adhesive resin is an ionomer resin.

7. The consolidated laminar structure of claim 1 or 2 wherein the first adhesive resin has a melt index of from about 200 to about 400.

8. The consolidated laminar structure of claim 1 or 2 wherein the first adhesive resin constitutes from about 15 to about 75 weight percent of the polymer blend.

9. The consolidated laminar structure of claim 1 or 2 wherein the first adhesive resin constitutes from about 20 to about 60 weight percent of the polymer blend.

10. The consolidated laminar structure of claim 9 wherein the second adhesive resin constitutes from about 10 to about 70 weight percent of the polymer blend.

11. The consolidated laminar structure of claim 10 wherein the non-adhesive resin constitutes from about 10 to about 60 weight percent of said blend.

12. The consolidated laminar structure of claim 1 or 2 wherein the second adhesive resin is a random ethylene copolymer having from about 2 to about 12 weight percent, based upon the weight of said copolymer, of an ethylenically unsaturated carboxylic acid monomer copolymerized therein.

13. The consolidated laminar structure of claim 12 wherein the non-adhesive resin is a low density polyethylene having a density of from about 0.910 to about 0.930 and a melting point of from about 100° to about 120° C.

14. The consolidated laminar structure of claim 2 wherein the first adhesive resin comprises, in polymerized form, from about 15 to about 25 weight percent of the ethylenically unsaturated carboxylic acid monomer.

* * * * *

UNITED STATES PATENT AND TRADEMARK OFFICE
CERTIFICATE OF CORRECTION

PATENT NO. : 4,416,937
DATED : November 22, 1983
INVENTOR(S) : Bruce A. Metzger

It is certified that error appears in the above—identified patent and that said Letters Patent is hereby corrected as shown below:

Col. 2, line 2, "completing" should read -- competing --;

Col. 2, line 52, "(e.g., acid," should read -- (e.g., acrylic acid, --;

Col. 3, line 56, "methyacrylic" should read -- methacrylic --;

Col. 3, line 60, "ehtylenically" should read -- ethylenically --;

Col. 6, Table II, line 47, insert -- of -- between "percent" and "low";

Col. 6, Table II, line 52, insert -- of a -- between "percent" and "low";

Col. 7, Claim 1, line 13, "70" should read -- 700 --.

Signed and Sealed this

Eighth Day of May 1984

[SEAL]

Attest:

GERALD J. MOSSINGHOFF

Attesting Officer   Commissioner of Patents and Trademarks